US008751564B2

(12) United States Patent
 Martch (10) Patent No.: US 8,751,564 B2
(45) Date of Patent: Jun. 10, 2014

(54) REDUCING LATENCY FOR SERVED APPLICATIONS BY ANTICIPATORY PREPROCESSING

(75) Inventor: Gregg Henry Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 157 days.

(21) Appl. No.: 13/090,024

(22) Filed: Apr. 19, 2011

(65) Prior Publication Data
US 2012/0271876 A1    Oct. 25, 2012

(51) Int. Cl.
*G06F 15/16*    (2006.01)

(52) U.S. Cl.
USPC ............. 709/203; 707/999.101; 707/999.103; 707/999.107

(58) Field of Classification Search
USPC .......................................................... 709/203
See application file for complete search history.

(56) References Cited

U.S. PATENT DOCUMENTS

| 7,685,144 | B1 | 3/2010 | Katragadda | |
| 2002/0054104 | A1* | 5/2002 | Berczik et al. | 345/764 |
| 2002/0080156 | A1* | 6/2002 | Abbott et al. | 345/700 |
| 2004/0181598 | A1* | 9/2004 | Paya et al. | 709/227 |
| 2007/0100890 | A1* | 5/2007 | Kim | 707/104.1 |
| 2008/0109401 | A1* | 5/2008 | Sareen et al. | 707/3 |
| 2012/0169646 | A1* | 7/2012 | Berkes et al. | 345/174 |

FOREIGN PATENT DOCUMENTS

WO    2004040896 A2    5/2004

OTHER PUBLICATIONS

European Patent Office, International Searching Authority, "International Search Report and Written Opinion" mailed Jul. 24, 2012 for International Appln. No. PCT/US2012/033935, filed Apr. 17, 2012.

* cited by examiner

*Primary Examiner* — Tauqir Hussain
(74) *Attorney, Agent, or Firm* — Ingrassia Fisher & Lorenz, P.C.

(57) ABSTRACT

A server that hosts an application transmits a state of the application to a client. The server determines that a response to the state is expected and that the response will be one of a finite number of possible responses. The server then generates one or more additional states utilizing at least one possible response from the finite set and provides the additional state(s) to the client. In some implementations, the server provides the additional state when the response is actually received. However, in other implementations, the server provides the additional state when generated and the client presents it when user input that equals the response is received. Additionally, in various implementations, the server may generate an additional state for each of the possible responses. However, in various other implementations, the server may generate additional states for a selected number of the possible responses.

18 Claims, 7 Drawing Sheets

REDUCING LATENCY FOR SERVED APPLICATIONS BY ANTICIPATORY PREPROCESSING

FIELD OF THE INVENTION

This disclosure relates generally to served applications, and more specifically to preprocessing applications states for served applications in anticipation of user input to reduce latency in providing an application state that corresponds to a user's input.

SUMMARY

The present disclosure discloses systems and methods for reducing latency for served applications by anticipatory preprocessing. One or more servers may host one or more applications. As part of hosting the application, the server may transmit one or more first states of the application to one or more clients, determine that one or more client responses to the first state are expected, and determine that the client response will be one or more of a finite number of possible responses. The server may then generate one or more additional states utilizing at least one possible response from the finite set of possible responses and may provide the additional state to the client.

In some implementations, the server may provide the additional state when the particular possible response is actually received from the client. However, in other implementations, the server may provide the additional state to the client when generated and the client may present the received additional state when user input that equals the particular possible response is received.

Additionally, in various implementations, the server may generate an additional state for each of the possible responses. However, in various other implementations, the server may generate additional states for a selected number of the possible responses. In such other implementations, the server may utilize one or more of a variety of different techniques to select which of the possible responses for which to generate additional states such as by generating additional states for possible responses defined as potentially latency causing, generating additional states for a number of possible responses that are more probable to actually be received than other possible responses, generating additional states for a number of possible responses selected based on server load, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Software applications (such as video games, web browsers, electronic mail clients, word processors, spread sheets, and so on) perform an almost unlimited variety of operations for users, such as Internet access, word processing, spread sheet functions, electronic mail, entertainment, and so on. Such software applications may be hosted by one or more servers (such as front end servers, back end servers, and so on). The servers may perform various processing operations for the software applications based on input received from one or more users via one or more clients. Such a client may transmit user input to such a server that processes the received input to generate an updated state of the software application. The server may provide the updated state to the client, which may then present the provided updated state to one or more users.

However, such a client-server software application configuration may result in delays. For example, the server may need time to process user input received from the client before the server is able to provide an updated state for the software application to the client. The time between when the server receives user input from the client and when the server is able to provide the updated state to the client may result in delays for a user utilizing the client. Depending on various factors such as server workload, time required for communication between the server and the client, and so on, the delays caused by server processing may be unacceptable for users. As a result of such delays, user may be dissatisfied with the performance of such software applications and may even cease using such software applications.

The present disclosure discloses systems and methods for reducing latency for served applications by anticipatory preprocessing. One or more servers may host one or more applications. As part of hosting the application, the server may transmit one or more first states of the application to one or more clients. The client may present the first state to one or more users and may receive user input in response, which the client may then transmit to the server. When the server transmits the first state, the server may determine that one or more client responses to the first state are expected and that the client response will be one or more of a finite number of possible responses. The server may then generate one or more additional states utilizing at least one possible response from the finite set of possible responses and may provide the additional state to the client. In some implementations the server may provide the additional state to the client when the server receives the client response and the client response equals the possible response utilized to generate the additional state. In other implementations, the server may transmit the additional state to the client when generated and the client may utilize the received additional state when the client determines that the client response equals the possible response utilized to generate the received additional state. As the additional state is generated prior to receipt of the client response, delay between the time when the server receives the client response and when the server provides the updated state may be avoided.

Figure 1:
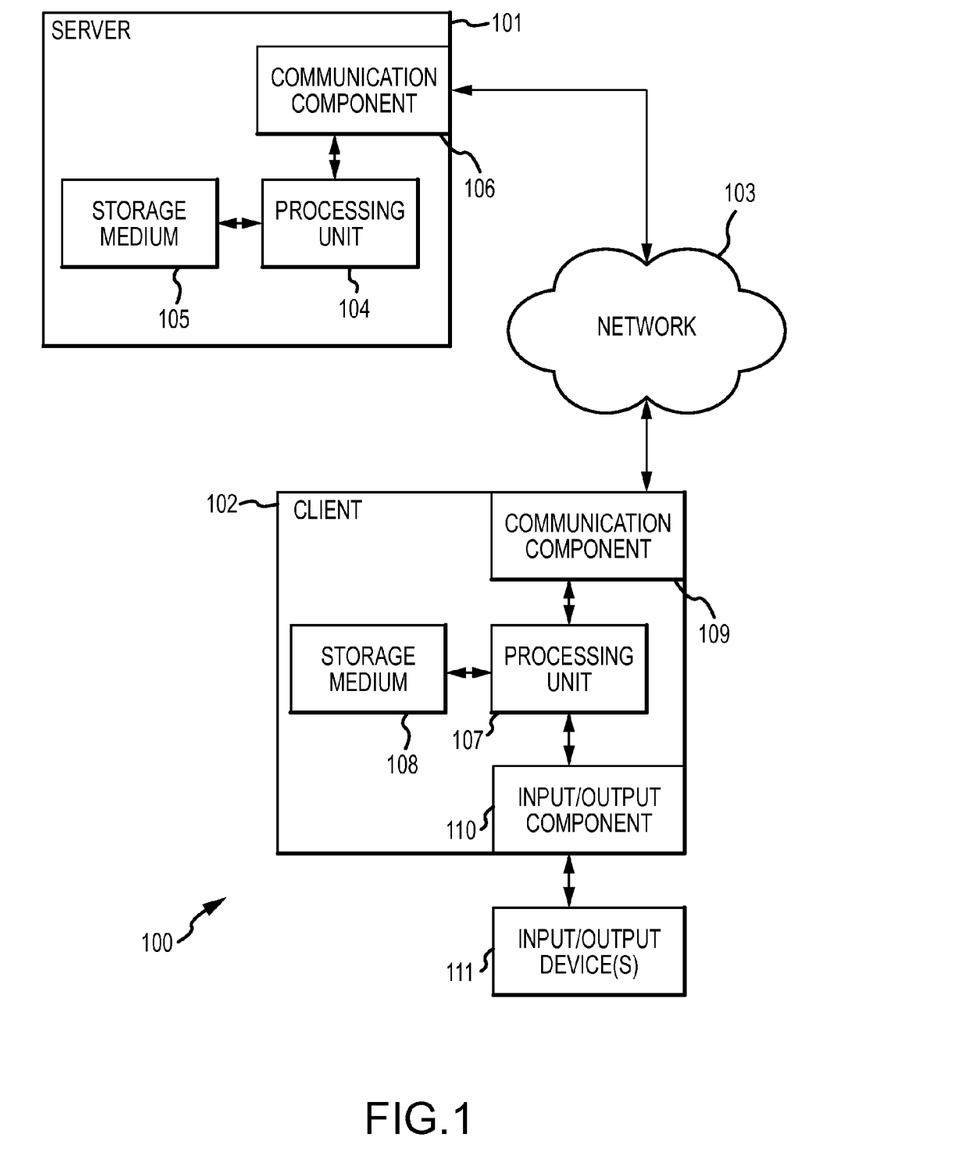
FIG. 1 is a block diagram illustrating a system for reducing latency for served applications by anticipatory preprocessing.

FIG. 1 is a block diagram illustrating a system 100 for reducing latency for served applications by anticipatory preprocessing. The system 100 includes one or more servers 101 that are communicably coupled to one of more clients 102 via one or more networks 103. The server and the client may be any kind of computing device such as a server computer, a personal computer, a desktop computer, a laptop computer, a mobile computing device, a tablet computing device, a cellular telephone, a smart phone, and/or other such computing device. The network may be any kind of communication network such as a local area network, a wide area network, the Internet, a WiFi network, a satellite communication network, a coaxial communication network, an Ethernet network, a cellular network, and/or any other kind of communication network. Although the server and the client are shown and described as connected via the network, it is understood that in various implementations the server may be directly communicably coupled to the client without utilization of a network.

The server 101 may include one or more processing units 104, one or more non-transitory storage media 105 (which may take the form of, but is not limited to, a magnetic storage medium; optical storage medium; magneto-optical storage medium; read only memory; random access memory; erasable programmable memory; flash memory; and so on), and one or more communication components 106. The processing unit 104 may execute instructions stored in the non-transitory storage medium 105 to host one or more software applications. In hosting the application, the processing unit may generate one or more states for the application, process user input received form the client 102 via the communication component 106 to generate one or more states for the application, and/or perform other such processing for the hosted application.

The client 102 may include one or more processing units 107, one or more non-transitory storage media 108 (which may take the form of, but is not limited to, a magnetic storage medium; optical storage medium; magneto-optical storage medium; read only memory; random access memory; erasable programmable memory; flash memory; and so on), one or more communication components 109, and one or more input/output components 110 (which may receive input from and/or provide output to one or more associated input/output devices 111 such as one or more monitors, keyboards, mice, and other such input and/or output devices). The processing unit 107 may execute instructions stored in the non-transitory storage medium 108 to receive one or more states of the application from the server 101 via the communication component 109, provide such states of the application to one or more users via the input/output component 110, receive input from the user for the application via the input/output component, transmit such input to the server via the communication component 109, and/or perform other such client side operations for the application.

The server 101 may transmit a first state of the application to the client via the communication component 106. The server may determine that one or more expected client responses to the first state will be one or more of a finite set of possible responses. As the possible client responses are finite, the server may generate one or more additional states based on one or more of the possible responses prior to the actual receipt of such responses so that the additional states may be already available when the corresponding client responses are received. The server may provide such generated additional states to the client 102 via the communication component 106.

For example, a server hosting a video game application may provide an initial state for the video game. The server may determine that user input is expected in response to the initial state of the video game in order for the user to play the video game. The server may also determine that the expected user input will indicate selection of one or more buttons on an associated video game controller because that is the only user input that the video game is configured to receive. Hence, anticipating that the user may select one or more of the buttons, the server may generate an additional state based on selection of one of the buttons in anticipation that the respective button may be selected by the user in response to the initial state of the video game. Such a video game controller may include a relatively small number of buttons, such as seven. As such, the server may only be required to anticipatorily generate seven different states such that the generated state is already available when one of the buttons is selected regardless which button is actually selected.

In various implementations, the server 101 may provide the additional state generated utilizing a particular possible response to the client 102 when the particular possible response is actually received from the client. Previous to actually receiving the particular possible response utilized to generate an additional state, the generated additional state may be stored by the server, such as on the non-transitory storage medium 105. In such implementations, if one or more generated additional states are stored until the particular possible response utilized to generate the respective additional state is actually received, the server may cease storing the additional states generated for a particular possible response if a different particular possible response is received from the client.

However, in various other implementations the server 101 may provide the additional state generated utilizing a particular possible response to the client 102 when generated. The client may store the received additional state (such as on the non-transitory storage medium 108) until user input that equals the particular possible response is received via the input/output component 110 whereupon the client may present the additional state via the input/output component. In such other implementations, if one or more generated additional states are stored until the particular possible response utilized to generate the respective additional state is actually received, the client may cease storing the additional states generated for a particular possible response if user input corresponding to a different particular possible response is received via the input/output component.

Further, in some implementations, the server 101 may generate an additional state for each of the possible responses. As such, the additional state corresponding to whichever possible response that is received may be already available when the corresponding client response is actually received. However, in other implementations, the server may generate additional states for a selected number of the possible responses. In such other implementations, the server may utilize one or more of a variety of different techniques to select which of the possible responses for which to generate additional states. Such techniques are discussed in more detail below.

Figure 2:
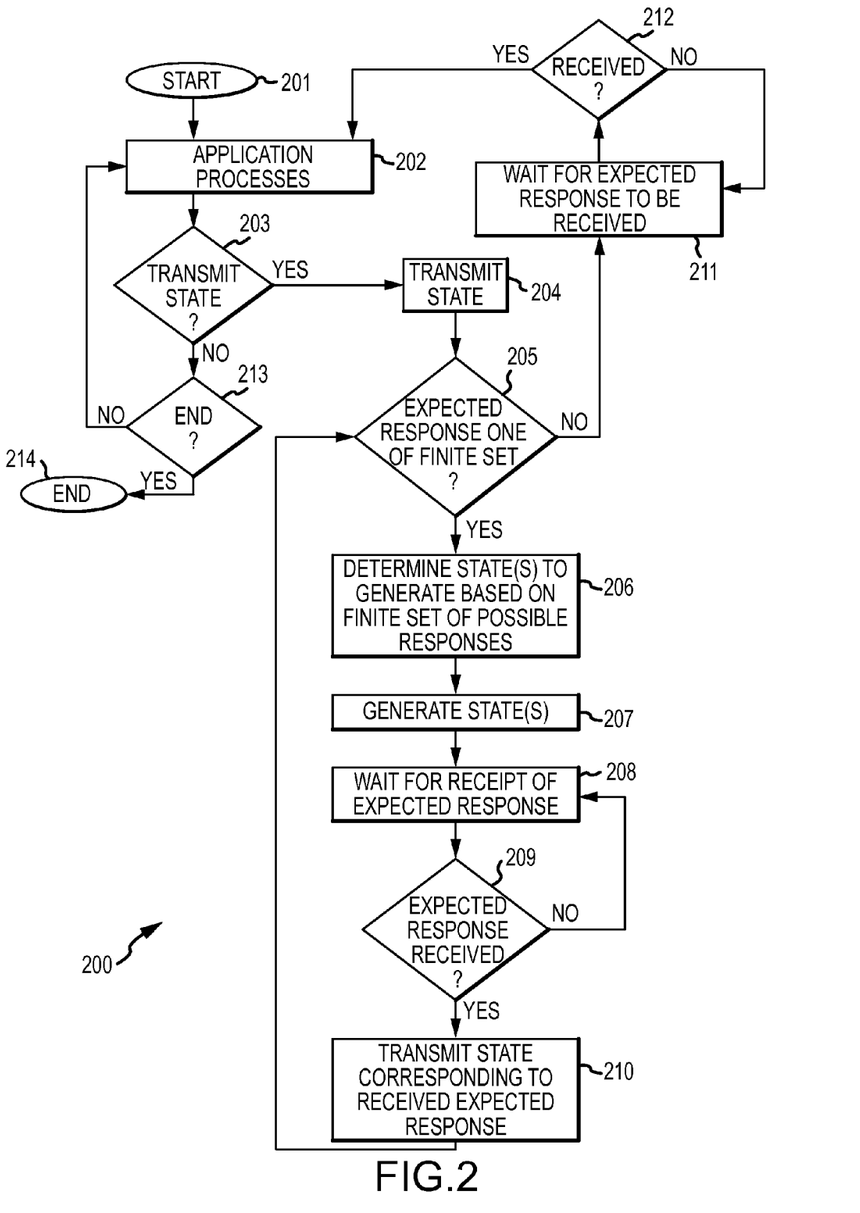
FIG. 2 is a flow chart illustrating a method for reducing latency for served applications by anticipatory preprocessing. This method may be performed by the system of FIG. 1.

FIG. 2 illustrates a method 200 for reducing latency for served applications by anticipatory preprocessing. The method 200 may be performed by the server 101 of FIG. 1. The flow begins at block 201 and proceeds to block 202 where the software application hosted by the server processes. The flow then proceeds to block 203 where the server determines whether or not to transmit a state of the software application. If so, the flow proceeds to block 204. Otherwise, the flow proceeds to block 213 where the server determines whether or not the software application has ended. If so, the flow proceeds to block 214 and ends. Otherwise, the flow returns to block 202 where the software application continues processing.

At block 204, after the server 101 determines to transmit a state of the software application, the server transmits the state and the flow proceeds to block 205. At block 205, the server determines whether or not a response to the transmitted state is expected and will be one of a finite set of possible responses. If so, the flow proceeds to block 206. Otherwise, the flow proceeds to block 211 where the server waits for the expected response before the flow proceeds to block 212. At block 212, the server determines if the response has been received. If so, the flow returns to block 202 where the software application continues processing. Otherwise, the flow returns to block 211 where the server continues to wait for the expected response.

At block 206, after the server 101 determines that a response to the transmitted state is expected and will be one of a finite set of possible responses, the server determines which states to generate based on the possible responses in the finite set of possible responses. The flow then proceeds to block 207 where the server generates the determined states. Next, the flow proceeds to block 208 where the server waits for the expected response before the flow proceeds to block 209. At block 209, the server determines if the response has been received. If not, the flow returns to block 208 where the server continues to wait for the expected response.

Otherwise, the flow proceeds to block 210 where the server 101 transmits the generated state that corresponds to the received response. The flow then proceeds to block 205 where the server determines whether or not a response to the transmitted generated state is expected and will be one of a finite set of possible responses.

Although the method 200 is illustrated and described as transmitting a generated state when a response utilized to generate that state is actually received, it is understood that this is merely an example. In other possibilities, the server 101 may transmit generated states when they are generated. In such possibilities, the client 102 may utilize such received generated states when user input is received that corresponds to possible responses utilized to generate the states.

Returning to FIG. 1, as discussed above, in some implementations, the server 101 may utilize one or more of a variety of different techniques to select which of the possible responses for which to generate additional states. Examples of such different techniques will now be elaborated. However, the examples herein elaborated are merely for the purposes of example. Other techniques (and/or combinations of those presented) to select which of the possible responses for which to generate additional states may be utilized without departing from the scope of the present disclosure.

In a first example implementation, the server 101 may analyze the finite set of possible responses and define each of the possible responses as either potentially latency causing or not potentially latency causing. The server may then generate additional states for each of the possible responses that are defined as potentially latency causing but may not generate additional states for the possible responses that are defined as potentially latency causing. For example, the server may define possible responses that would require the server to encode video frames as potentially latency causing whereas the server may define possible responses that overlay a preexisting menu over preexisting video frames as not potentially latency causing.

By generating additional states for possible responses that are more likely to result in larger delays in the time the server requires to provide the additional state upon request but not those for possible responses that are not likely to result in such delays, the server may minimize the amount of anticipatory processing time spent while minimizing the time required to transmit requested additional states. Even though additional states for possible responses that are not defined as latency causing may have to be generated after the actual response requesting such is received, as such additional states are less likely to cause latency in processing then generating such additional states after receiving the response may still not result in unacceptable latency.

In a second example implementation, the server 101 may generate additional states for a number responses of the possible responses that are more probable to be actually received than other possible responses. The server may determine the probability that a particular possible response will actually be received based on statistical analysis of previously received responses. For example, the application may be configured to accept ten different inputs in response to a particular application state, but only four of those inputs may be commonly selected in response to the particular application state. The server may determine that the four inputs of the ten possible are statistically more likely than the other six and may generate additional states for each of the four inputs.

By generating additional states for possible responses that are more probable to actually be selected, the server may minimize the amount of anticipatory processing time spent while maximizing the possibility that a requested state has already been generated and thus minimizing response time. Even though additional states for the other six inputs may have to be generated after the actual response requesting such is received, as such additional states are less likely to be requested the frequency of delays related to generating such additional states over time may result in an aggregated delay time that is acceptable.

In a third example implementation, the server 101 may generate additional states for a number of the possible responses that are selected based on a current load of the server, such as a current processing load. In this way, the server may adjust the amount of anticipatory processing that the server attempts to perform based on the resources that are available. The server may then generate the selected number of additional states. For example, if the server is currently not performing any other tasks, the server may select to generate additional states for all possible responses. To the contrary, if the server is performing a number of other tasks but still has available resources, the server may generate additional states for half of the possible responses. Further, if the server has no available resources, the server may generate an additional state for one or none of the possible responses. By selecting a number of a additional states to generate based on the server's ability to generate such states, the server may perform more anticipatory processing when the server has available resources for such processing while performing less anticipatory preprocessing when the server does not have such resources available.

Figure 3A:
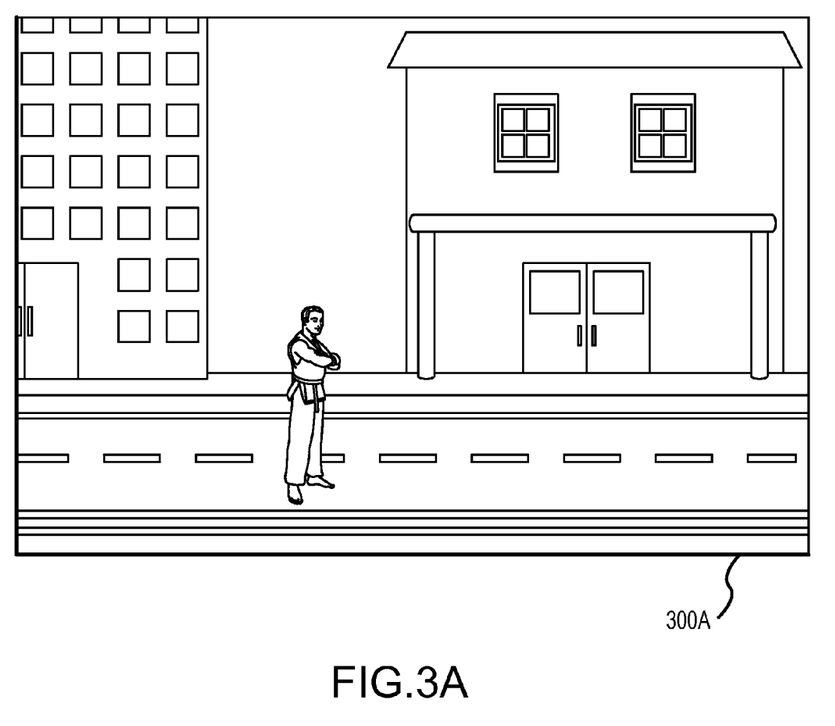
FIGS. 3A-3E are diagrams illustrating video game screens corresponding to states of a video game displayed by a system for a user. The system may be the system of FIG. 1.

FIGS. 3A-3E are video game screens 300A-300E corresponding to states of a video game displayed by a system for a user. The system may be the system of FIG. 1. As illustrated in FIG. 3A, the screen 300A includes an avatar in an environment. In this state, the video game is configured to accept user input indicating to make the avatar move to the right, move to the left, kick, and jump. Previous to receiving such user input in response to the state depicted in screen 300A, the system may generate additional states for each of the above four possible user inputs.

Figure 3B:
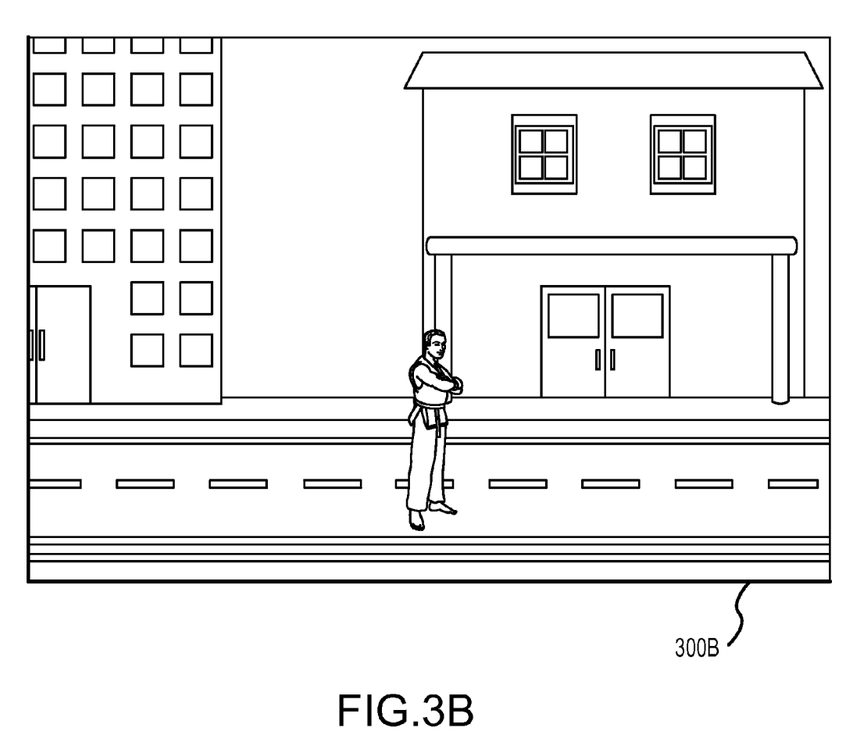
Figure 3C:
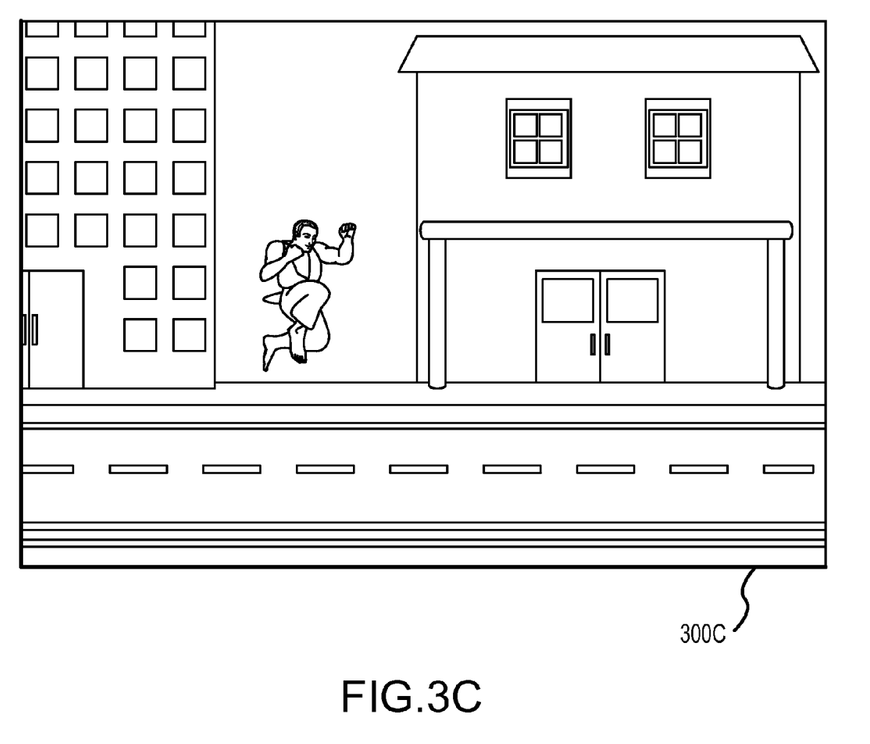
Figure 3D:
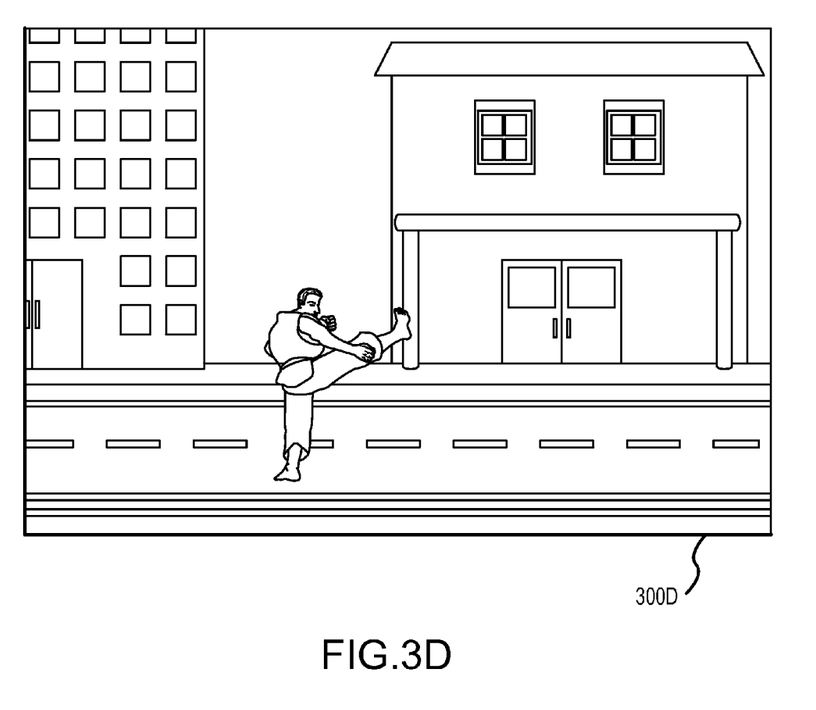
Figure 3E:
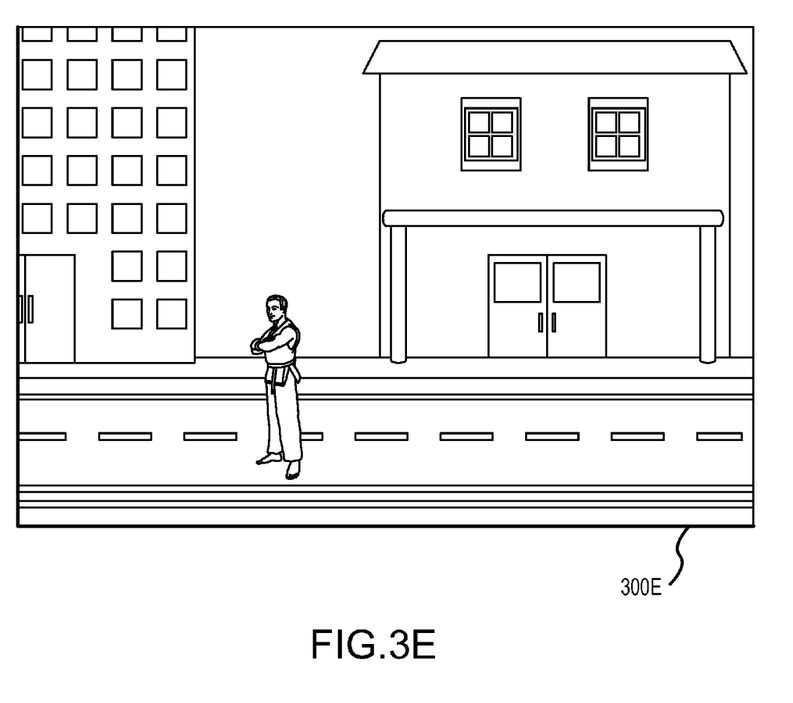

FIG. 3B illustrates a screen 300B that depicts a state generated utilizing the presumption that the user will indicate to make the avatar move right. FIG. 3C illustrates a screen 300C that depicts a state generated utilizing the presumption that the user will indicate to make the avatar jump. FIG. 3D illustrates a screen 300D that depicts a state generated utilizing the presumption that the user will indicate to make the avatar kick. FIG. 3E illustrates a screen 300E that depicts a state generated utilizing the presumption that the user will indicate to make the avatar turn left.

Referring again to FIG. 3A, subsequent to the system generating the additional states, the system may receive user input in response to the state depicted by the screen 300A. They system may then transmit the corresponding additional state that corresponds to the option indicated by the user input. For example, if the user input specifies to make the avatar move right, the system may transmit the additional state depicted by the screen 300B in FIG. 3B. As the state has been generated prior to receipt of the user input, the server may not cause delay by having to generate the state and may instead immediately transfer the appropriate state.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for reducing latency for served applications by anticipatory preprocessing, the method comprising:

transmitting at least one first state of at least one application from at least one server, which hosts the at least one application, to at least one client;

determining, utilizing the at least one server, that at least one expected client response from the at least one client to the at least one first state will be at least one of a finite set of possible client responses;

generating, utilizing the at least one server, at least one additional state of the at least one application utilizing at least one possible client response from the finite set of possible client responses prior to receiving the at least one expected client response from the at least one client; and providing the at least one additional state from the at least one server to the at least one client, wherein said operation of providing the at least one additional state from the at least one server to the at least one client further comprises providing the at least one additional state from the at least one server to the at least one client prior to receiving one of the finite set of possible client responses.

2. The method of claim 1, wherein said operation of providing the at least one additional state from the at least one server to the at least one client further comprises providing the at least one additional state from the at least one server to the at least one client in response to receiving the at least one expected client response wherein the at least one expected client response equals the at least one potential client response.

3. The method of claim 1, wherein the at least one client utilizes the provided at least one additional state when at least one user input corresponding to the at least one expected client response equals the at least one possible client response.

4. The method of claim 1, wherein said operation of generating, utilizing the at least one server, at least one additional state of the at least one application utilizing at least one possible client response from the finite set of possible client responses prior to receiving the at least one expected client response from the at least one client further comprises generating at least one state for each possible client response of the finite set of possible client responses utilizing the respective possible client response.

5. The method of claim 1, wherein said operation of generating, utilizing the at least one server, at least one additional state of the at least one application utilizing at least one possible client response from the finite set of possible client responses prior to receiving the at least one expected client response from the at least one client further comprises:

defining each of the finite set of possible client responses as potentially latency causing or not potentially latency causing; and generating at least one state for each possible client response of the finite set of possible client responses defined as potentially latency causing utilizing the respective possible client response.

6. The method of claim 1, wherein said operation of generating, utilizing the at least one server, at least one additional state of the at least one application utilizing at least one possible client response from the finite set of possible client responses prior to receiving the at least one expected client response from the at least one client further comprises:

determining a probability that each possible client response of the finite set of possible client responses will equal the at least one expected client response; and generating at least one state for each of a number of possible client responses of the finite set of possible client responses, utilizing the respective possible client response, that have a higher determined probability than other possible client responses of the finite set of possible client responses.

7. The method of claim 6, wherein the probability that each possible client response of the finite set of possible client responses will equal the at least one expected client response is determined based on statistical analysis of previous client responses.

8. The method of claim 1, wherein said operation of generating, utilizing the at least one server, at least one additional state of the at least one application utilizing at least one possible client response from the finite set of possible client responses prior to receiving the at least one expected client response from the at least one client further comprises:
determining a current load of the server; and
generating at least one state for each of a selected number of possible client responses of the finite set of possible client responses utilizing the respective possible client response wherein selection of the selected number of client responses is based on the determined current load of the server.

9. The method of claim 1, wherein the at least one application comprises at least one video game.

10. A system for reducing latency for served applications by anticipatory preprocessing, comprising:
at least one communication component configured to communicate with at least one client;
at least one non-transitory storage medium that stores at least one series of instructions; and
at least one processing unit that executes the at least one series of instructions to:
transmit at least one first state of at least one application hosted by the at least one processing unit to the at least one client via the at least one communication component;
determine that at least one expected client response from the at least one client to the at least one first state will be at least one of a finite set of possible client responses;
generate at least one additional state of the at least one application utilizing at least one possible client response from the finite set of possible client responses prior to receiving the at least one expected client response from the at least one client via the at least one communication component; and
provide the at least one additional state to the at least one client via the at least one communication component,
wherein the at least one processing unit provides the at least one additional state to the at least one client via the at least one communication component prior to receiving one of the finite set of possible client responses.

11. The system of claim 10, wherein the at least one processing unit determines a current processing load and generates at least one state for each of a selected number of possible client responses of the finite set of possible client responses utilizing the respective possible client response wherein the at least one processing unit selects the selected number based on the determined current processing load.

12. The system of claim 10, wherein the at least one processing unit determines a probability that each possible client response of the finite set of possible client responses will equal the at least one expected client response and generates at least one state for each of a number of possible client responses of the finite set of possible client responses, utilizing the respective possible client response, that have a higher determined probability than other possible client responses of the finite set of possible client responses.

13. The system of claim 12, wherein the at least one processing unit determines the probability that each possible client response of the finite set of possible client responses will equal the at least one expected client response by performing statistical analysis of previous client responses.

14. The system of claim 10, wherein the at least one processing unit defines each of the finite set of possible client responses as potentially latency causing or not potentially latency causing and generates at least one state for each possible client response of the finite set of possible client responses defined as potentially latency causing utilizing the respective possible client response.

15. The system of claim 10, wherein the at least one processing unit generates at least one state for each possible client response of the finite set of possible client responses utilizing the respective possible client response.

16. The system of claim 10, further comprising the at least one client wherein the at least one client utilizes the provided at least one additional state when at least one user input corresponding to the at least one expected client response equals the at least one possible client response.

17. The system of claim 10, wherein the at least one processing unit provides the at least one additional to the at least one client via the at least one communication component in response to receiving the at least one expected client response via the at least one communication component wherein the at least one expected client response equals the at least one potential client response.

18. A computer program product comprising:
a first set of instructions, stored in at least one non-transitory machine readable medium, executable by at least one processing unit to transmit at least one first state of at least one application from at least one server, which hosts the at least one application, to at least one client; and
a second set of instructions, stored in the at least one non-transitory machine readable medium, executable by the at least one processing unit to determine that at least one expected client response from the at least one client to the at least one first state will be at least one of a finite set of possible client responses;
a third set of instructions, stored in the at least one non-transitory machine readable medium, executable by the at least one processing unit to generate at least one additional state of the at least one application utilizing at least one possible client response from the finite set of possible client responses prior to receiving the at least one expected client response from the at least one client; and
a fourth set of instructions, stored in the at least one non-transitory machine readable medium, executable by the at least one processing unit to provide the at least one additional state to the at least one client prior to receiving one of the finite set of possible client responses.

* * * * *